United States Patent [19]

Latypov

[11] Patent Number: 5,423,556
[45] Date of Patent: Jun. 13, 1995

[54] INTERACTIVE COMPUTER GAME

[75] Inventor: Nourakhmed Latypov, Moscow, Russian Federation

[73] Assignee: World Epsilon Enterprise Inc., Staten Island, N.Y.

[21] Appl. No.: 92,621

[22] Filed: Jul. 15, 1993

[51] Int. Cl.⁶ ............................................. A63B 67/00
[52] U.S. Cl. .................... 273/434; 273/85 G; 273/DIG. 28; 273/153 S; 273/153 R
[58] Field of Search ............ 273/434, 85 G, DIG. 28, 273/153 S, 153 R

[56] References Cited

U.S. PATENT DOCUMENTS

| | | | |
|---|---|---|---|
| 4,184,676 | 1/1980 | Barish | 273/237 |
| 4,508,353 | 4/1985 | Meyer et al. | 273/313 |
| 4,530,499 | 7/1985 | Breslow et al. | 273/434 |
| 4,863,172 | 9/1989 | Rosenwinkel et al. | 273/153 S |
| 5,018,743 | 5/1991 | Maier et al. | 273/242 |
| 5,088,928 | 2/1992 | Chan | 434/339 |

FOREIGN PATENT DOCUMENTS 2237514  5/1991  United Kingdom ................. 273/434
2245186  1/1992  United Kingdom ................. 273/434

Primary Examiner—Vincent Millin
Assistant Examiner—Kerry Owens
Attorney, Agent, or Firm—Pennie & Edmonds

[57] ABSTRACT

An interactive computer game uses a digital computer system with a display and an interactive means for communicating user input to the computer system. The system displays on the display an array of elements in rows and columns, each of the elements having a feature distinguishable by a player of the game. In addition, at least one element can be moved by the user via the interactive means. This element can be added at one end of a row or a column of the array thereby shifting this row or column by one element and removing another element from an opposite end of the row or column. When a row or a column is formed in which the elements have a predetermined pattern of features, that row or column is erased from the display. If, within a given time interval, a player is unable to build such a row or a column which has a predetermined pattern of features, the system adds a new row or column of elements to the display.

23 Claims, 13 Drawing Sheets

INTERACTIVE COMPUTER GAME

SUMMARY OF THE INVENTION

This invention relates to a computer game useful for entertainment and education.

The game comprises a computer system having an interactive input device and a display. In a preferred embodiment, the computer system provides means for displaying elements at least some of which are arranged in an array having rows and columns. Each element has a feature, such as its color, selected from a finite set of such features. A player can move on the display at least one of the elements using the interactive input device of the computer. When a movable element is added to one end of a row or a column of the array, the row or column is shifted by one element, another element is removed from the opposite end of that row or column, and the removed element becomes movable. The goal of the game is to move and shift the elements so as to construct rows and columns of the array having predetermined patterns of features.

More particularly, in the preferred embodiment the system displays to the player a collection of colored squares arranged as rows and columns of a rectangular field. One of the colored squares, which is referred to hereinafter as the active element, is located outside of the boundary of the field. A player can move the active element around the perimeter of the field from row to row and column to column using the interactive input device, such as the directional keys of a standard keyboard. A player can also move the active element into the row or column of the field to which it is adjacent. This is accomplished by shifting the row or column by one element, thereby pushing the element on the opposite side of the row or column out of the rectangular field. This operation exchanges the active element with the element on the opposite side of the field and alters the contents of the columns (or rows) across which the row (or column) was shifted.

A player moves the active element around the field periodically exchanging it with elements of selected rows and columns so as to create rows and columns having elements colored identically. When such a row or a column having identical elements is created, the system erases it from the display thereby reducing the number of the displayed elements. If only one row or one column remains on the display, it is erased automatically. A player wins when all the elements are erased.

If a player is unsuccessful in constructing a row or a column of the one color within a certain time limit, the system increases the number of displayed elements by adding an additional row or an additional column of randomly colored elements to the field.

The game can be played at different levels of difficulty which are determined by the time allowed to the player to construct a row or a column of matching elements prior to increasing the size of the field. Also, at higher levels of difficulty the system increases the size of the field and, therefore, the number of elements in the rows and columns.

This game can be easily understood by players, yet it is elegant and novel. As indicated, it can be adjusted for different levels of difficulty so that a player essentially never loses interest.

The game is not only useful for entertainment but also as an educational tool. In one embodiment the game can be used for teaching arithmetic to children. In this embodiment, each element is marked by a number and a player is required to construct rows and columns that add up to a given value. By progressing to high levels of the game a child continuously improves his/her skill in performing arithmetic operations. Similarly, the game can be useful for teaching spelling to children if each element is marked by a letter and a player is required to construct correctly spelled words.

The game can be implemented using practically any computer system including personal computers, time sharing systems, or dedicated hardware designed for a handheld implementation. It can be implemented in software using a conventional high level computer language or it can be built in hardware, for example, using a VLSI chip.

BRIEF DESCRIPTION OF THE DRAWINGS

These and other objects, features and advantages of the invention are described in the following detailed description of the preferred embodiment in which.

DETAILED DESCRIPTION OF THE PREFERRED EMBODIMENT

In the preferred embodiment, the game is implemented as a personal computer (PC) running a program stored on a diskette. The computer comprises a standard keyboard ("interactive means") and a color monitor ("display"). For example, an IBM PC compatible computer with two megabytes of memory, an Intel 286 processor, and an EGA color monitor can be utilized for the game of this invention. In other embodiments, this game can be implemented using a wide variety of systems and hardware. Instead of a PC it can run on a larger workstation or on a time-sharing system. The color monitor is optional since the elements can be distinguished by the features other than their color; and other input devices, such as a mouse, can be used as interactive means. The game described herein can also be implemented as a dedicated hand-held unit which executes micro-code or employs a custom VLSI circuit.

Figure 13:
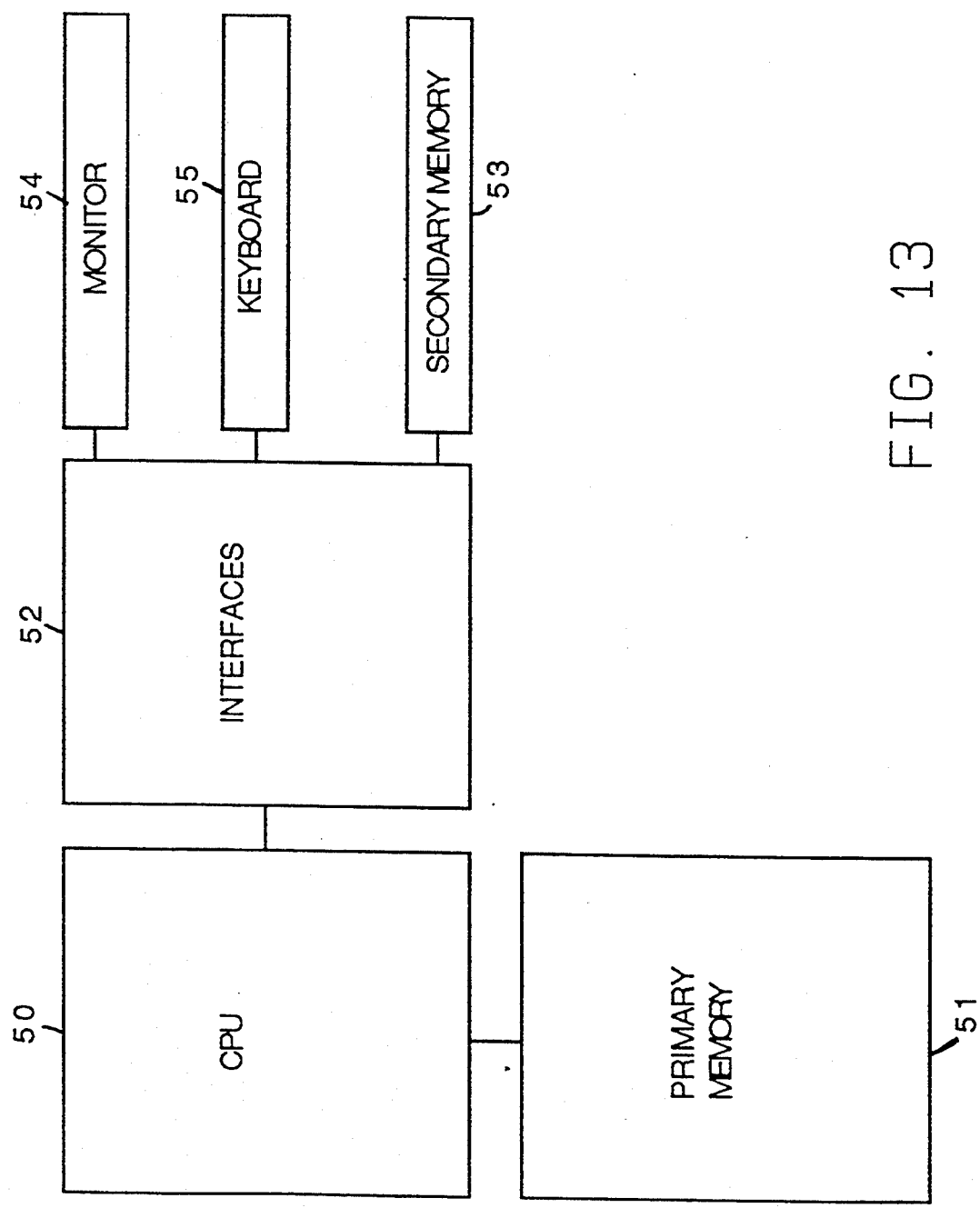
FIG. 13 is an example of conventional computer architecture that can support the game of this invention.

An example of a conventional architecture suitable for the implementation of this game is shown in FIG. 13. Such a conventional computer has a CPU 50 with primary memory 51 and interfaces 52 to secondary memory 53 such as diskettes, monitor 54, keyboard 55, and other input devices.

Figure 1:
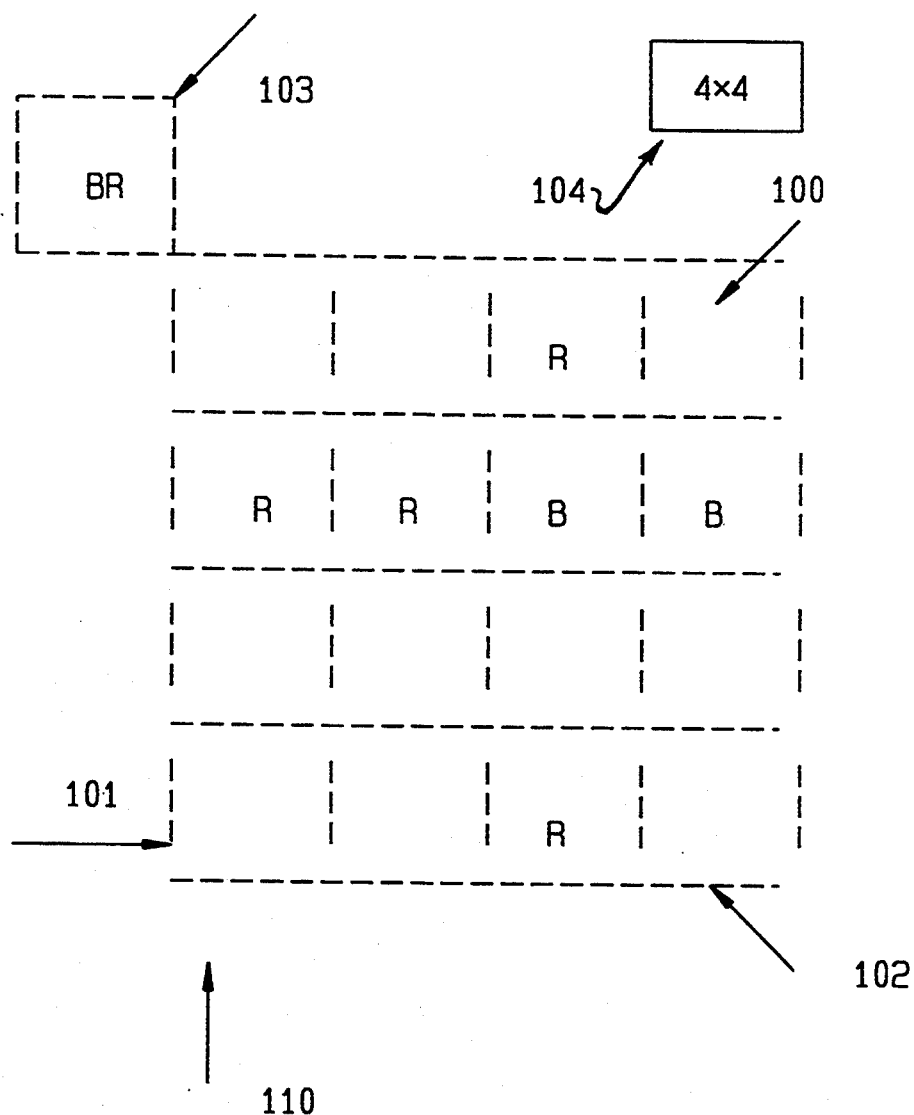
FIGS. 1–7 schematically illustrate selected display screens of the preferred embodiment of this invention.

The progress of the game is illustrated in conjunction with FIGS. 1–7 which depict selected screens of the game. In FIG. 1, elements 100, are arranged as rows 101 and columns 102 of a rectangular field 110, which sometimes is referred to as a play-field. For the purposes of this illustration the colors are designated by characters (e.g. "R" for red, "G" for green, "B" for blue, "Br" for brown).

An active element 103 is located outside of the play-field. The active element abuts one of the elements of the field or has a common point with one of its corner elements. FIG. 1 depicts an initial screen of the game wherein the active element is outside of the left hand corner of the field and the elements of the field form a square. Initially, the colors of the elements are selected randomly, except, there are no rows or columns of identically colored elements.

As described previously, the game may be played at several levels of difficulty. The level is displayed at 104. In the preferred embodiment, the level of difficulty corresponds to the size of the field in the beginning of the game. As the player progresses to higher levels of the game, the size of the field increases. The number of different colors (features) of elements employed in the game may also be varied to change its difficulty. In the embodiment disclosed, the number of different colors is equal to the dimension of the field in the beginning of the game. For example, in FIG. 1, the field initially comprises 4×4 elements, each of which is designated by one of four colors and the level of difficulty is also 4.

The goal of the game is to maneuver the active element 103, so as to construct rows or columns comprising elements of the same color. The system permits moving the active element along the boundary of the rectangle in response to user's input via interactive means. A user can also move the active element into the row or column it abuts. As a result, the row or column is displaced such that an element on the opposite side is shifted outside of the field. This displaced element becomes a new active element. Thus to create rows and columns of the same color, a user moves the active element around the perimeter of the field and periodically shifts the active element into a row (or column) to exchange the active element with one of the elements of the field and to alter the contents of the column (or row) across which the row (or column) is shifted.

Figure 2:
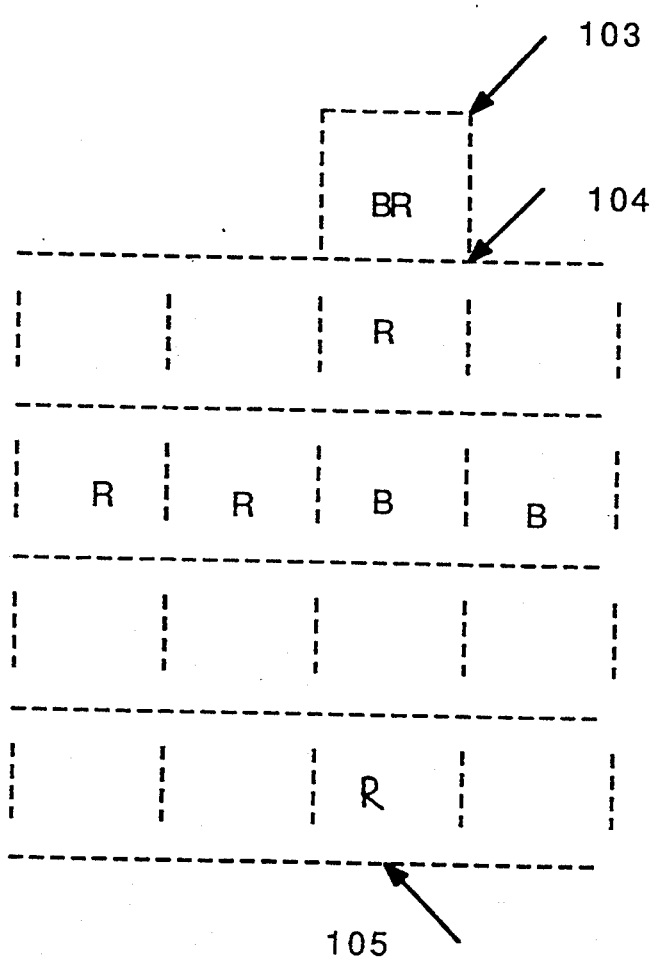
Figure 3:
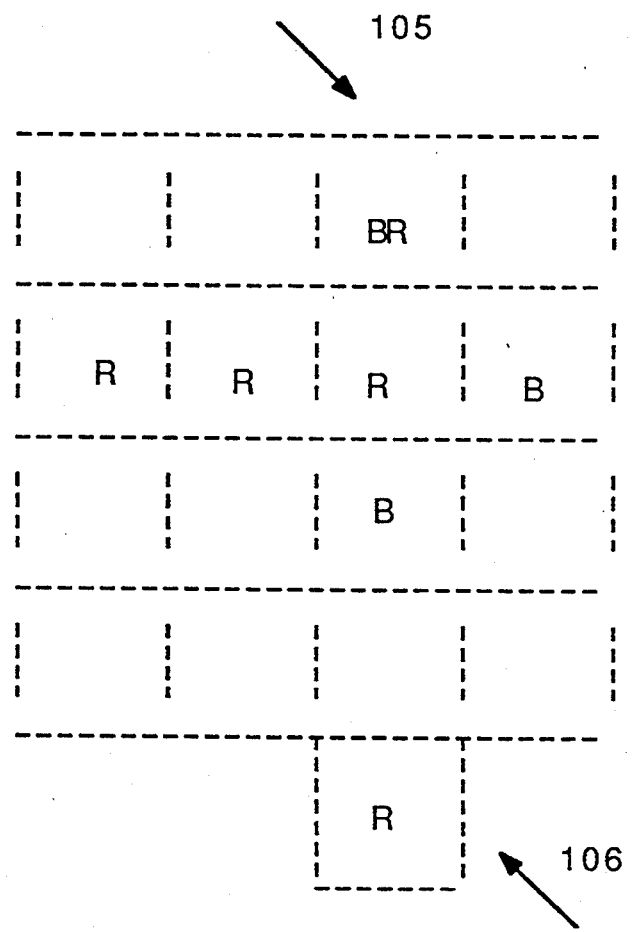

FIG. 2 illustrates the active element 103 being moved around the perimeter of the field to abut element 104 of column 105. FIG. 3 illustrates the active element 103 being moved into column 105, thereby shifting the column down and pushing element 106 to the outside of the field. As a result element 106 became a new active element controllable by the user and the previous active element 103 became one of the elements of the field which can not directly be moved by a user. In addition, the contents of the individual rows are altered by the displacement of column 105.

Figure 4:
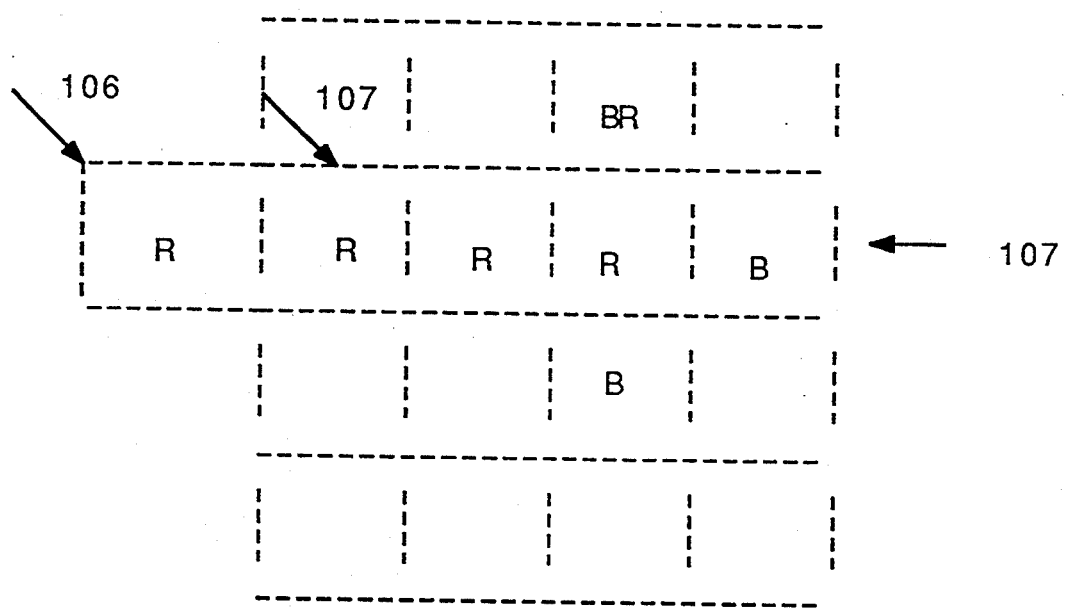
Figure 5:
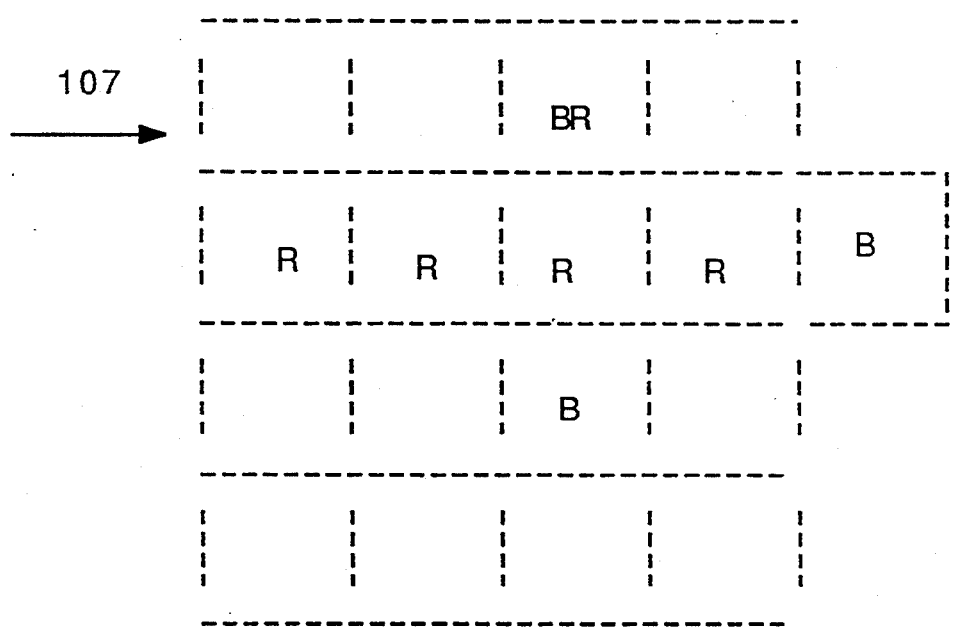
Figure 6:
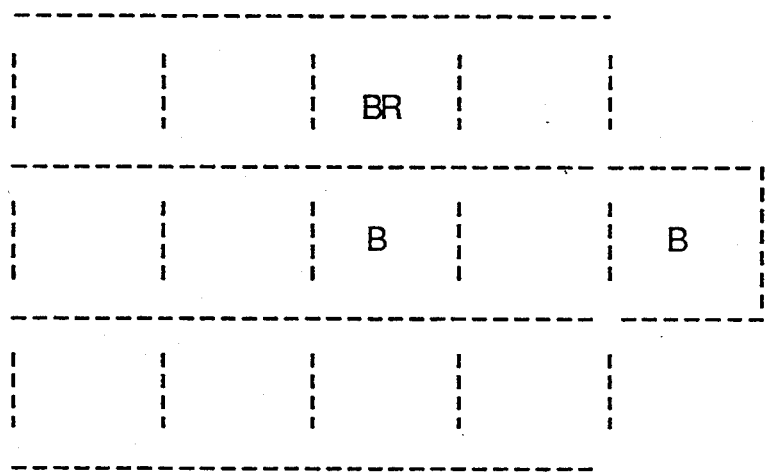

FIG. 4 illustrates the new active element 106 being moved around the field to abut row 107. In FIG. 5, the active element 106 is moved into row 107, which, as a result, consists of elements of the same color. As explained previously, if a row or column consists of identical elements, it is eliminated from the field. As illustrated in FIG. 6, row 107 had been erased thereby reducing the total number of the elements in the field. Each time a player eliminates a row or a column thereby reducing the number of the elements, the system allows less time for building the next row or column of matching elements prior to adding new elements to the field.

Figure 7:
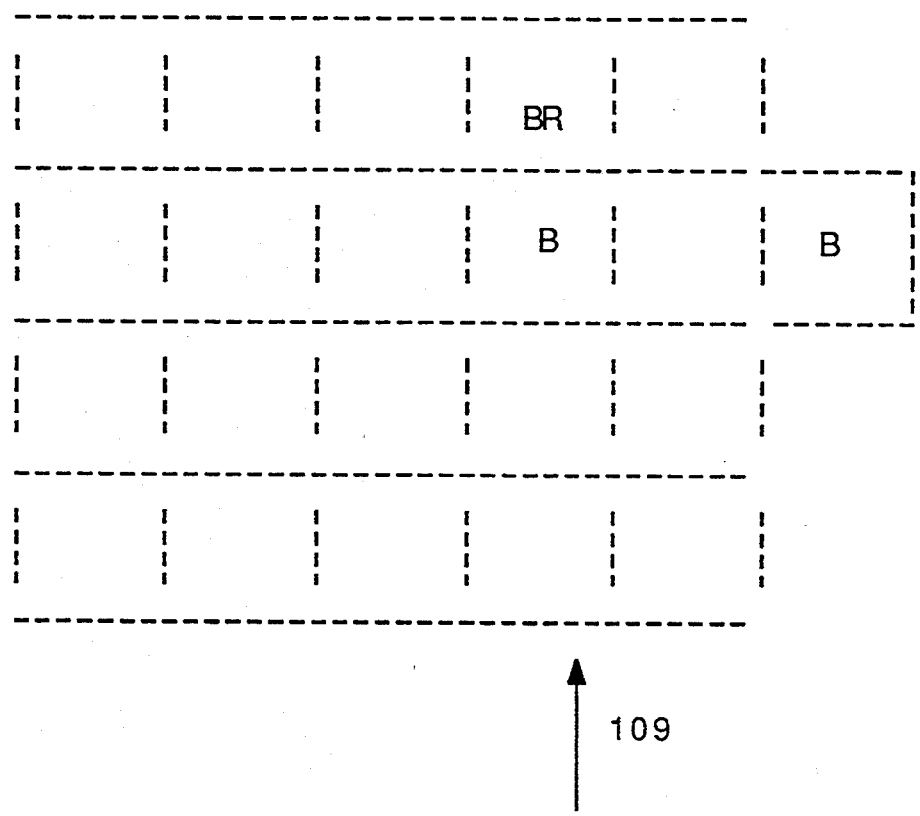

If within a predetermined time limit a player is unable to build a row or a column consisting of identical elements, the system adds another row or column of elements to the field. If the elements of the field do not form a square, an extra row or column is added so as to increase the shorter dimension of the field. In FIG. 7, the field is increased by adding row 109 of randomly colored elements. The game ends when the size of the field grows to a predetermined number of elements, for example, 12×13 elements.

If a player wins by eliminating all the elements from the field, the system automatically begins a new game at a more difficult level. Accordingly, the game can be generalized to a series of games of different levels of difficulty, and the player's goal is to win at all the levels in minimal time. The time elapsed since the beginning of the first game is displayed to the player.

The preferred embodiment of the present invention comprises a computer program written in C language. Flowcharts in FIGS. 8–12 schematically illustrate the operation of the program.

Figure 8:
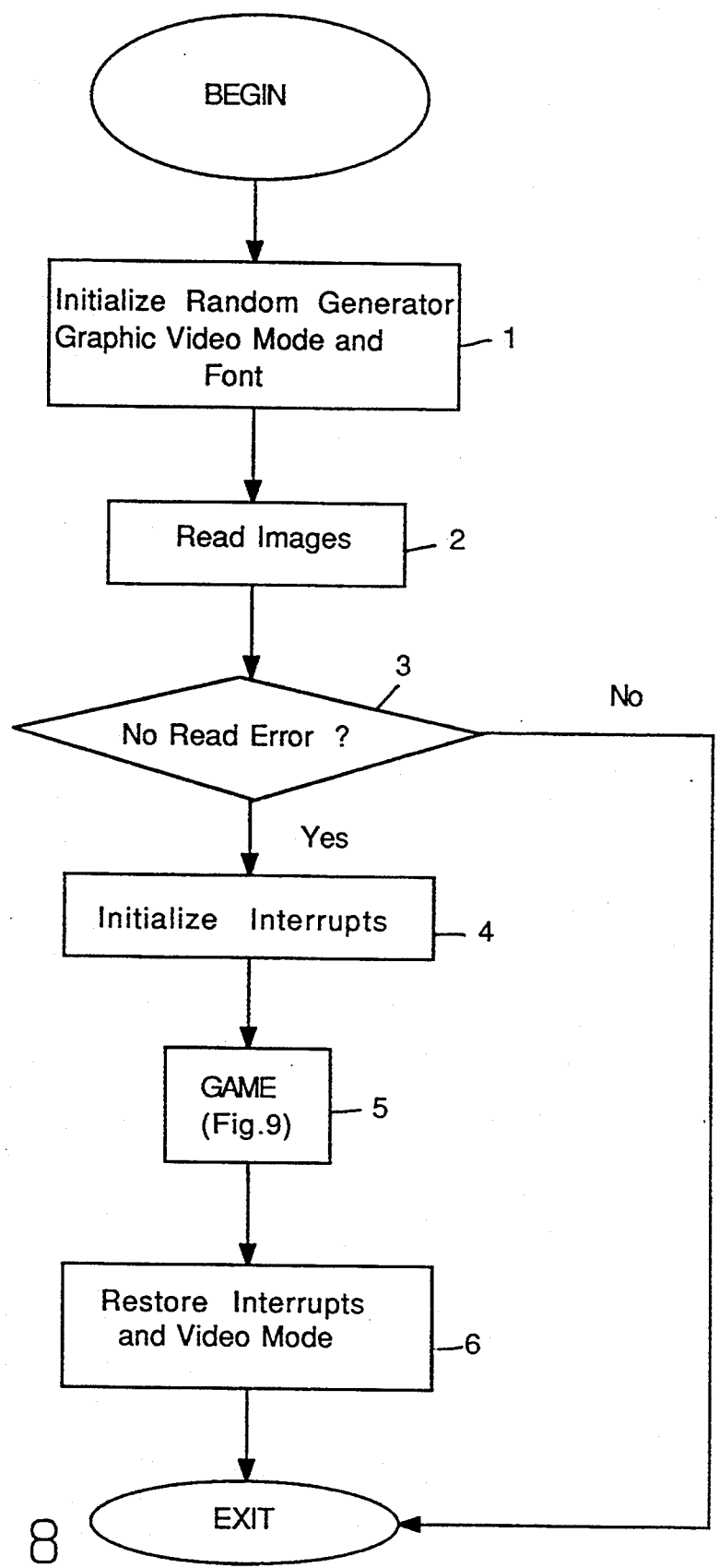
FIGS. 8–12 illustrate a flowchart of the steps performed by the computer in executing the game of this invention.

In FIG. 8, at block 1, the system performs initialization. Specifically, the system initializes a random number generator with the current system time, sets graphic video mode for video display, and alphanumeric font for the output messages. Next, at block 2, the system reads and decompresses the images that are employed in various display screens of the game. These images include an introductory logo, graphical representations of the elements, and graphics for displaying game time and difficulty level. If the system failed to read this data properly (test 3), the program terminates. Otherwise, at block 4, the system performs further initialization (i.e., the interrupts for system's timer and keyboard are initialized). Block 5 symbolically illustrates the steps executed while playing one or more games and is further explained in conjunction with FIGS. 9-12. Prior to terminating the program, the system restores the original system parameters, i.e., the original interrupts and alphanumeric video mode.

Figure 9:
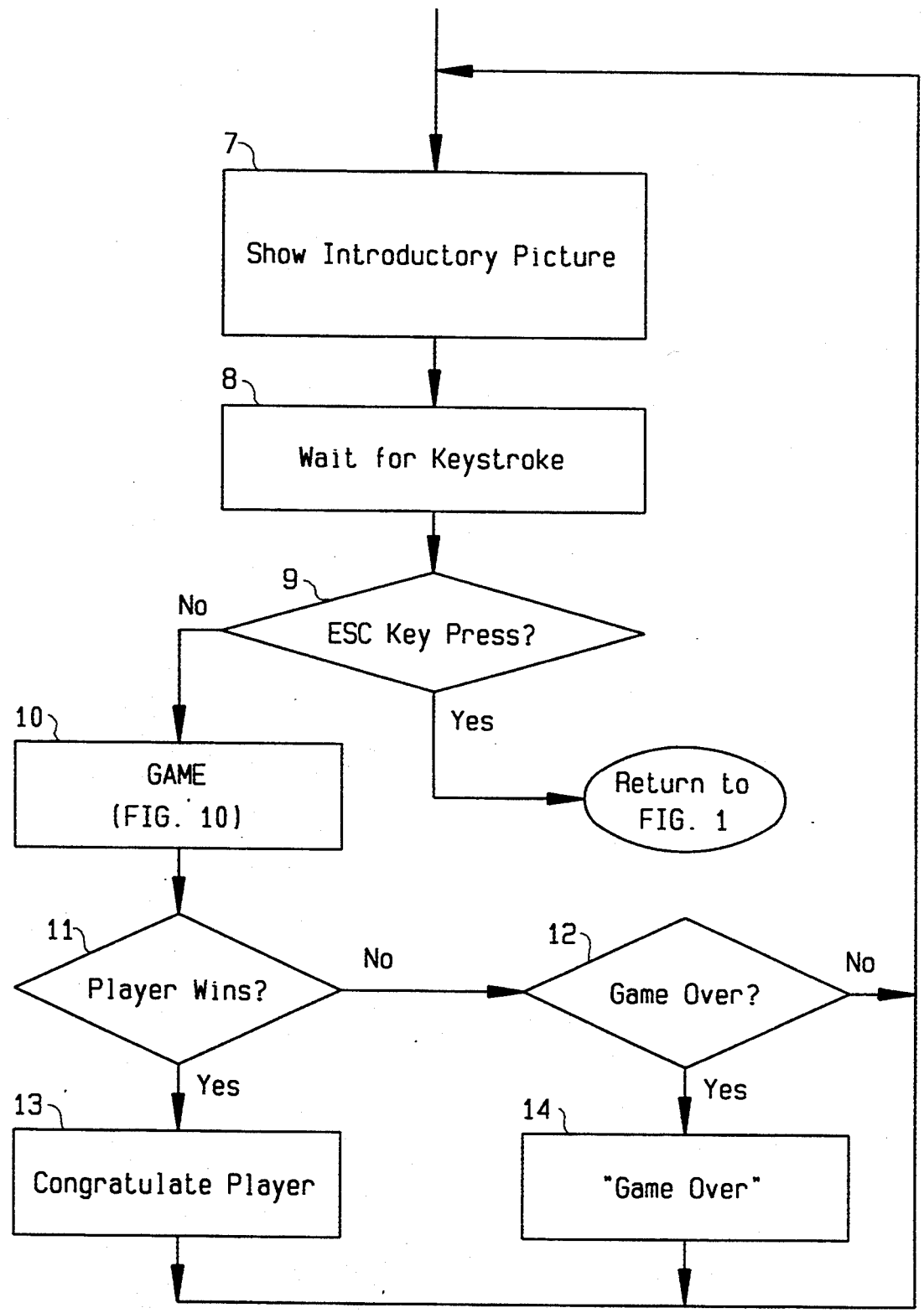

The implementation of the game is further illustrated in FIG. 9 which corresponds to block 5 of FIG. 8. Initially, the system displays an introductory game logo (block 7) and then waits for a player to enter any keystroke (block 8). Next, at test 9, the system determines whether an "Escape" key has been pressed. If so, program flow returns to block 6 of FIG. 1 and the game terminates. Otherwise, at block 10, a user proceeds to play a series of games of various difficulty, as further explained in conjunction with FIG. 10.

If a player wins at all the levels of difficulty, at test 11, the systems displays a message congratulating the player and flow returns to block 7. Otherwise, if the game is terminated because, at some point, the field grew to its predetermined maximum size (for example, 12×13 elements), or Escape key had been pressed, (test 12), the "Game Over" message is displayed and flow returns to block 7.

Figure 10:
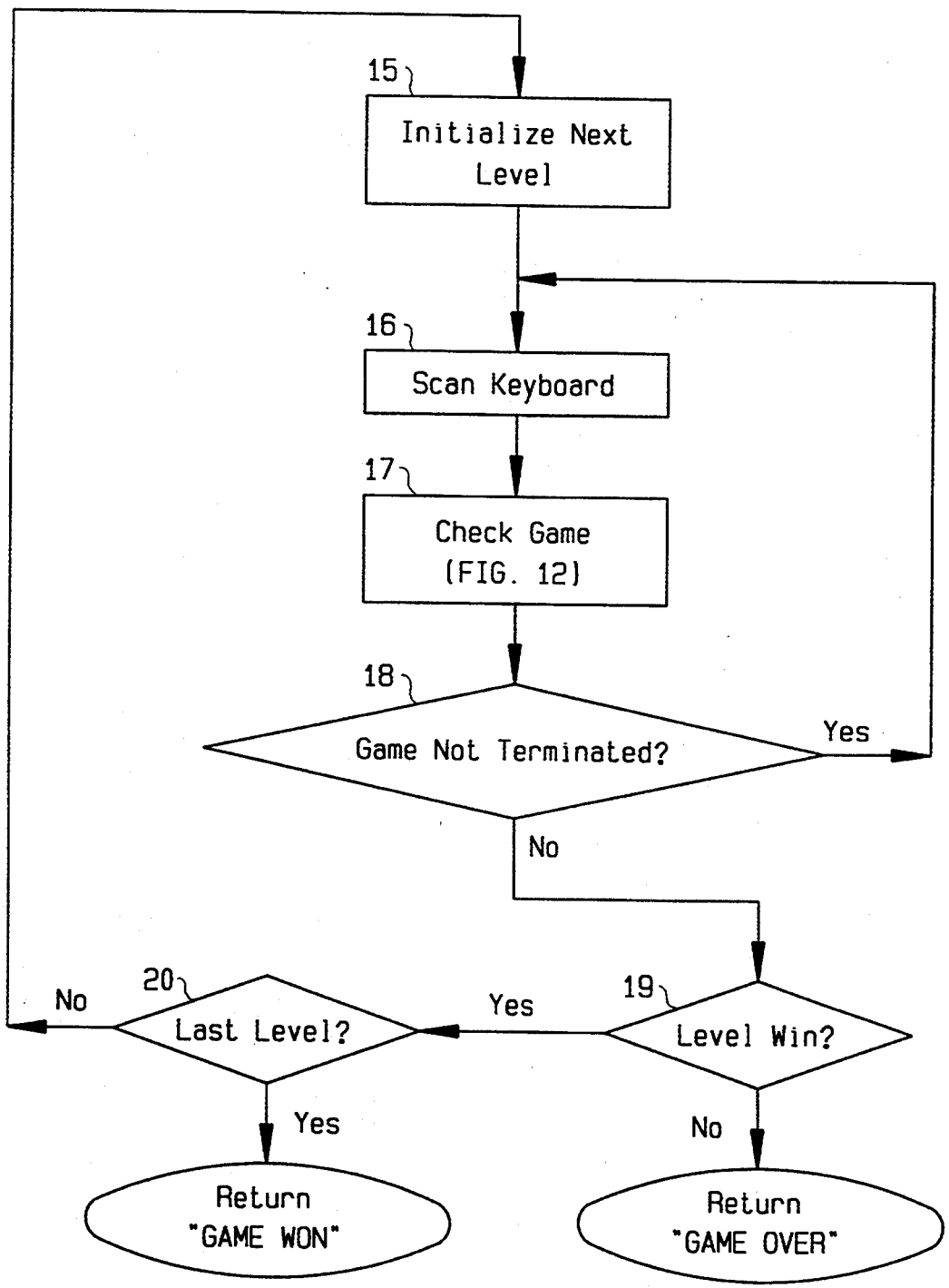

FIG. 10 describes the steps that implement playing a series of games of various difficulty. First, at block 15, which is explained in detail in conjunction with FIG. 11, the system initializes the difficulty level and game time. Next, at block 16, the system receives and interprets the player's keyboard entry. This entry can be (1) pressing Left, Right, Up, or Down arrow keys to move the active element, (2) pressing Escape key to terminate the game, or (3) "None," i.e. not providing any meaningful input. At block 17, the system takes an appropriate action on the basis of the player's input. Such an action may include moving the graphical representation of the active element on the display, deleting a row or a column if it consists of the elements having the same color, adding an extra row or column to the field if an appropriate time interval elapses, or not taking any action.

If after the current player's input, the game is not won at a given level or otherwise terminated (test 18) flow returns to block 16. Otherwise, program flow is transferred to test 19. At test 19, if the game is terminated but not won, flow returns to test 11 of FIG. 9. Otherwise, program flow is transferred to test 20. At test 20, if the game is won and the user was playing at the last level of difficulty, flow returns to test 11 of FIG. 9. If the user was not playing at the last level and won, flow returns to block 15, where a new game, at a higher level of difficulty, is initialized.

Figure 11:
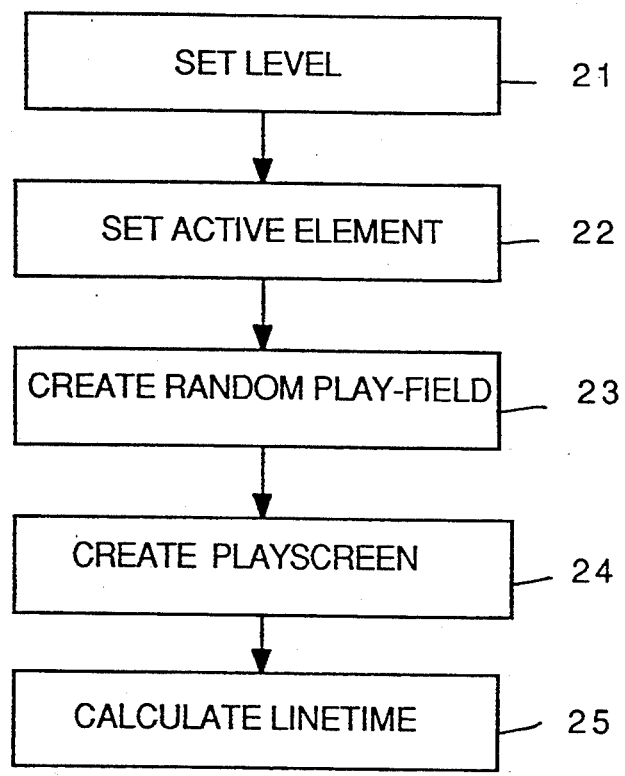

FIG. 11 illustrates the steps performed during the initialization of the game at a new difficulty level and corresponds to block 15 of FIG. 10.

At block 21, the system initializes the level of difficulty of the game. The level determines the dimensions of the initial field. In other words, the lowest level of difficulty is 4, which corresponds to the initial field 4×4. At each new level of difficulty, one row and one column of elements is added to the field. Accordingly, the next level of difficulty is 5 and the field consists of 5×5 elements. The level of difficulty also determines the number of colors selected for the elements. For example, at level 4 (field 4×4), the elements are selected from a set of four colors, and, at the next level 5 (field 5×5), the elements are selected from the set of five colors. In the preferred embodiment, the highest level is 12 (field 12×12).

As indicated, the game progresses to the next level of difficulty after a player successfully eliminates all the elements by building rows and columns of the same color. Thus, at block 21, the level is set to 4 (field 4×4) if the player enters the first level of the game, and each time he or she successfully completes the game the level is incremented by 1.

At block 22, the system selects the color of the active element from the set of colors available for the current level of difficulty. At block 23, the system creates the play-field having the size determined by the level of difficulty and consisting of the elements colored randomly from the set of colors provided at a given level. The system also verifies that the initial play-field does not contain rows or columns consisting entirely of the elements colored identically.

At block 24, the system generates and displays the initial screen of the game comprising the level number, the field displayed in the center of the screen, and the active element displayed outside of the play-field. Next, at block 25, the system determines the value of "Linetime" and displays this value. "Linetime" is a variable which value is the number of time units (for example, 1/18 of a second) that a player is given for constructing a row or column of matching elements. If such row or column is not constructed within the value of "Linetime", a new row or column of elements is added to the field. In the beginning of each game, the value of Linetime is determined by multiplying the value of "Limit" by 60. The initial value of "Limit" is stored for each level of the game.

Each time a sequence of matching elements is constructed and erased from the field, the value of "Linetime" is recomputed. Specifically, the value of "Limit" is decreased by 1 and "Linetime" is recomputed as described above (i.e., Limit=Limit−1; Linetime=Limit * 60). Conversely, if the system adds a row or a column to the field the value of Linetime is increased (Limit=Limit+1; Linetime=Limit * 60) Accordingly, the fewer elements remain in the field, the less time is given to a player to construct a row or column having elements of the same color. Also, note that the initial values of "Limit" for different levels of difficulty are selected such that at higher levels less time is available for constructing rows and columns of a given length.

Figure 12:
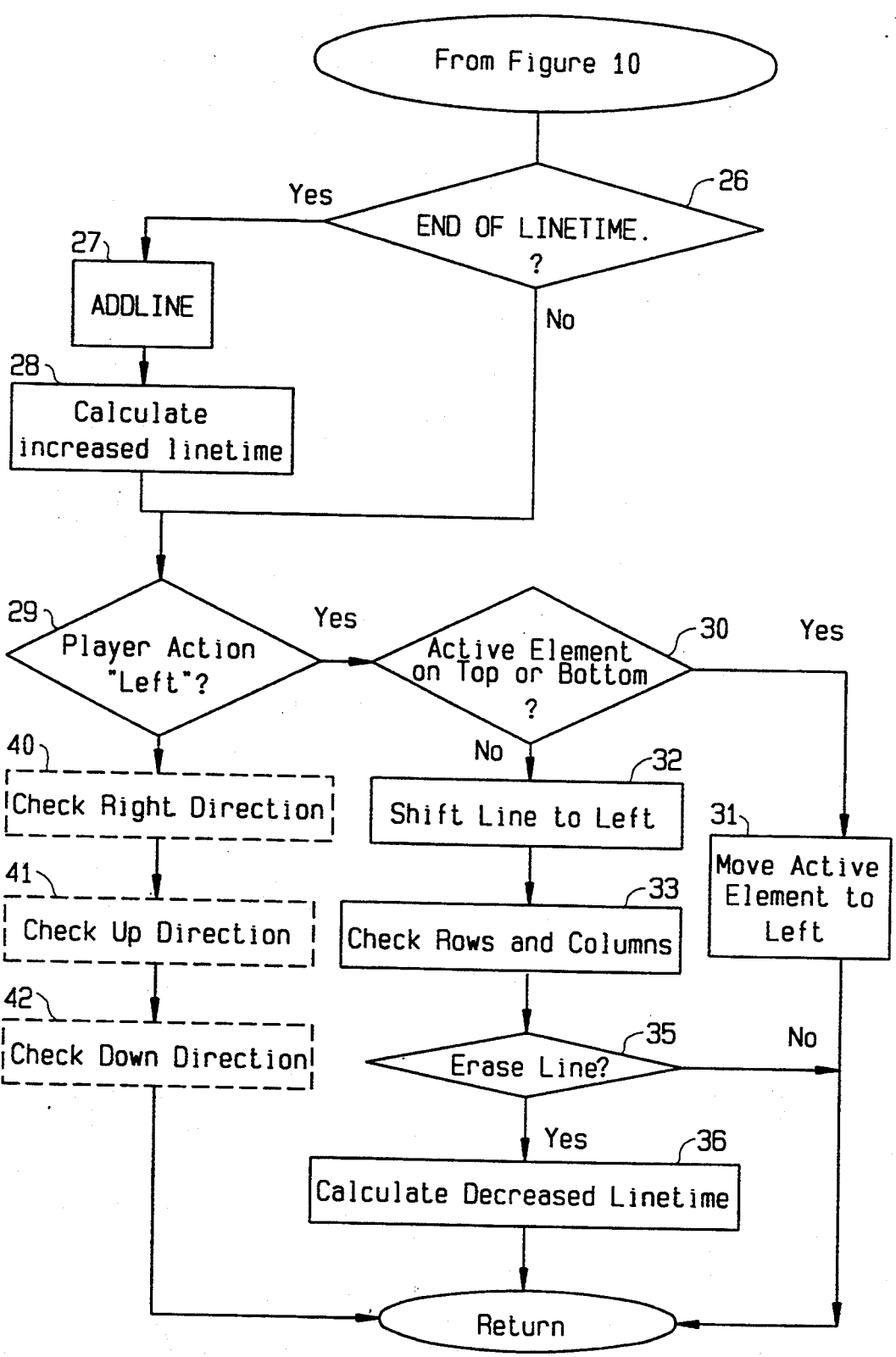

FIG. 12 describes the steps of the procedure shown as block 17 in FIG. 11. This procedure monitors the game and responds to user's commands. First, at test 26, the system determines whether the user was unable to construct a sequence of matching elements within the current "Linetime". If so, at block 27, another sequence of randomly arranged colored elements is added to the field. The system adds a new column if the field's horizontal dimension is less than its vertical dimension, and adds a new row otherwise. Next, at block 28, the system recomputes the Linetime as described previously (Limit=limit+1, Linetime=Limit * 60). Also note that if at block 27, a new row or column created the field of the maximum size, the "Game Over" indicator is returned to test 17 and the game terminates as described previously.

The remainder of this flowchart deals with the system's response to a user action. Note that if a user did not press one of the arrow keys (i.e., the user did not enter a meaningful input) or pressed the Escape key, program flow returns to test 18 of FIG. 10.

Let us assume that the user pressed one of the arrow keys. At test 29, the system checks whether the Left arrow was pressed, and if so, the control is transferred to test 30. Otherwise, the system checks if another direction key was pressed (40, 41, 42). Since the processing for each direction is analogous, the following discussion of processing for the Left direction is illustrative.

If the active element is at the top or the bottom of the field, the system moves the active element along the boundary of the field (block 31) and then program flow returns to FIG. 10. If the active element is on the left side of the field, no action is performed and program flow returns to test 18 on FIG. 10 (this branch is not shown). Otherwise, if the active element is on the right side of the field, the system shifts the row next to the active element to the left and replaces the active element with the element that was left-most in the row (block 32). At block 33, the system checks whether a row or a column of identical elements has been created and, if so, erases it (test 35) and decreases "Linetime" as described previously (block 36).

Let us address the steps taken by the system in conjunction with blocks 32–35 in greater detail. First, it should be noted that the system stores the elements of the field as a two-dimensional array of characters which identify the type (color) of the elements. The size of the field (its maximum coordinates) is also stored in the system. For the active element, the system stores a record which includes the x, y position of the active element and its type (color). Accordingly, to shift a given row to the left, as described in conjunction with block 32, the system 1) assigns the type of the left-most element of the row to the active element; 2) copies the type of each element Of the row to the element located in the array to its left (Field[y][x]=Field[y][x+1]); 3) copies the type of the active element into the right-most element of the row.

As discussed in conjunction with block 33, after the shift has been performed, the system checks whether a row or a column of identically colored elements has been created. The system selects the first element of each row and compares it to the other elements of the same row, and if all the elements are identical, the row is eliminated as described below. Similarly, for each column the system selects the first element and compares it to the other elements of the column and if all the elements are identical, the column is erased.

A row is erased by copying the type stored for each element located above the row being erased into the adjacent element below. (i.e., for each y above the row to be erased and for all x, Field[y−1][x]=Field[y][x]). The columns are erased in a similar fashion, (i.e. Field[y][x−1]=Field[y][x]). If the active element is next to a row or a column that has been erased, the system adjusts the location of the active element. After a row or a column is erased, the system checks if a single row or column remains on the display, and if so, terminates the game.

The embodiment of the invention described above is presented for purposes of illustration and should not be construed as limiting the invention in any way. Various other embodiments would not depart from the spirit of the present invention.

For example, the elements can be represented by different, not necessarily rectangular, shapes. Similarly, the field does not have to form a rectangle, but can be a circle or a star or any other shape. The game can also be played in three or more dimensions using elements that are cubes or spheres or other shapes. In addition, the elements on the field do not have to be shaped identically. For example, rows and columns can be constructed by matching elements having different shapes as it is done in a puzzle. In fact, the game can be used as a computerized puzzle where a user constructs a picture.

There are various ways to make the game more complicated. For example, the game may employ a "stop element", which when introduced in the field, precludes moving the active element into the row and column which contain the stop element. The active element may, under certain conditions, change its color unexpectedly; or the elements of the field may unexpectedly change their position; or the active element may be prohibited from shifting into certain rows and columns.

Similarly, in yet another embodiment, the movement of the active element can be prohibited in a given direction for a certain duration of time under certain conditions, the active element may move several positions at a time or another active element that moves automatically and interferes with the player may be introduced. The game can be implemented so as to allow the active element to move in more than two directions, such as diagonally, or conversely to constrain its movement to only one direction.

Also, it is possible to play with several fields displayed on one screen, such that the active element shares the boundary of two or more fields and can move from one field to another.

As indicated previously, the elements do not have to be designated by colors but can be designated by characters, for example, so that the game can be played on a monochrome display. Each element can be marked by a number such that a player is required to create rows and columns, which elements add up to a predetermined value. In a similar embodiment the elements can be marked by letters and utilized for teaching spelling to children.

Doubtless, numerous other embodiments can be conceived which would not depart from the teaching of the present invention which scope is defined by the following claims.

What is claimed is:

1. An interactive computer game comprising:
   A. a digital computer having a display and an interactive means for communicating user input to the computer system;
   B. means for displaying on the display an array of elements in rows and columns, each of the elements having a feature selected from a finite set of features that are distinguishable by a player of the game;
   C. means for moving on the display at least one of the elements relative to the array in response to user input via the interactive means; and
   D. means for adding to one of the rows and columns of the array an element that was moved there from elsewhere on the display and for removing an element from that row or column, whereby the features on the elements in a row or in a column can be changed to create predetermined patterns,
   wherein the means for adding an element and removing an element from a row or column comprises means for shifting a row or a column by at least one element, such that when an element is added at one end of a row or a column another element is removed from an opposite end of said row or column and becomes movable on the display relative to the array in response to the user input.

2. The game of claim 1 further comprising means for eliminating from the display a row or a column of elements having a predetermined pattern.

3. The game of claim 1 further comprising means for increasing the number of the displayed elements as a result of satisfying a predetermined condition.

4. The game of claim 3 wherein the means for increasing the number of the elements comprises:
   A. means for establishing a time limit for constructing a row or a column, whichever is constructed first, having features that match the predetermined pattern; and
   B. means for adding an additional row or an additional column of elements to the display if a player fails to construct a row or column having features that match the predetermined pattern within the time limit.

5. The game of claim 4 wherein the means for establishing a time limit further comprises means for setting an initial time limit according to a level of difficulty of the game.

6. The game of claim 4 wherein the means for establishing a time limit comprises:
   E. means for reducing the time limit if the number of the elements in the field has decreased during running of a previous time limit; and
   F. means for increasing the time limit if the number of the elements in the field has increased during running of a previous time limit.

7. The game of claim 1 wherein the rows and columns of the array of elements constitute a rectangular field and the element that is moved is moved around the periphery of the rectangular field.

8. The game of claim 7 wherein the elements are displayed as colored squares, the set of features is the set of colors of the squares, and the predetermined patterns are rows and columns having the squares colored identically.

9. An method of providing a player with an interactive computer game comprising the steps of:
   A. communicating user input to the computer system;

B. displaying on a display an array of elements in rows and columns, each of the elements having a feature selected from a finite set of features that are distinguishable by a player of the game;

C. moving on the display at least one of the elements relative to the array in response to user input via interactive means; and D. adding to one of the rows and columns of the array an element that was moved there from elsewhere on the display and for removing an element from that row or column, whereby the features on the elements in a row or in a column can be changed to create predetermined patterns, wherein the step of adding an element and removing an element from a row or column comprises shifting a row or a column by at least one element, such that when an element is added at one end of a row or column another element is removed from an opposite end of said row or column and becomes an active element of the game which is movable on the display by the player.

10. The method of claim 9 further comprising a step of eliminating from the display a row or a column of elements having a predetermined pattern.

11. The method of claim 10 further comprising a step of increasing the number of the displayed elements as a result of satisfying a predetermined condition.

12. The game of claim 11 wherein the step of increasing the number of the elements comprises:

A. establishing a time limit for constructing a row or column, whichever is constructed first, having features that match the predetermined pattern; and B. adding an additional row or an additional column of elements to the display if a player fails to construct a row or a column having features that match the predetermined pattern within the time limit.

13. The method of claim 12 wherein the step of establishing a the time limit further comprises setting an initial time limit according to a level of difficulty of the game.

14. The method of claim 13 wherein the step of computing time limit comprises:

A. reducing the time limit if the number of the elements in the field has been decreased; and B. increasing the time limit if the number of the elements in the field has been increased.

15. The method of claim 9 wherein the rows and columns of the array of elements constitute a rectangular field and the element that is moved is moved around the periphery of the rectangular field.

16. The method of claim 15 wherein the elements are displayed as colored squares, the set of features is the set of colors of the squares, and the predetermined patterns are rows and columns having the squares colored identically.

17. A method of providing a player with an interactive computer game comprising the steps of:

A. initializing a level of difficulty of the game;

B. displaying on a display a two-dimensional array of elements in rows and columns and an active element located outside of the array, each of the elements having a feature selected from a finite set of features that are distinguishable by a player of the game, wherein the dimensions of the array and the number of the features in the set are determined on the basis of the level of difficulty;

C. establishing a time interval within which a player has to form a row or a column, whichever is formed first, of matching elements;

D. in response to a player's input, moving one element around the display and into either a row or a column of the array whereupon said row or column, shifts by one element in the direction of said movement and an element at the opposite end of said row or column is removed from the row or column and becomes an active element movable by the player; and E. erasing a row or a column of matching elements from the display if the row or column, of matching elements is formed within the time interval.

18. The method of claim 17 further comprising the step of adding to the array a row or a column of elements having randomly selected features if a player is unable to construct a row or a column consisting of matching elements within the time interval.

19. The method of claim 18 further comprising the steps of increasing the time interval after a row or a column has been added and decreasing the time interval after a row or a column has been erased.

20. An interactive computer game comprising:

A. a digital computer having a display and an interactive means for communicating user input to the computer system;

B. means for displaying on the display an array of elements in rows and columns in a rectangular field, each of the elements having a feature selected from a finite set of features that are distinguishable by a player of the game;

C. means for moving on the display at least one of the elements around the periphery of the rectangular field in response to user input via the interactive means; and D. means for adding to one of the rows and columns of the array an element that was moved there from elsewhere on the display and for removing an element from that row or column, whereby the features on the elements in a row or column can be changed to create predetermined patterns, wherein the means for adding an element and removing an element from a row or column comprises means for shifting a row or column by one element, such that an element is added at one end of a row or column and removed from an opposite end of said row or column, wherein the removed element becomes an active element which is movable on the display in response to the user input.

21. The game of claim 20 wherein the elements are displayed as colored squares, the set of features is the set of colors of the squares, and the predetermined patterns are rows and columns having the squares colored identically.

22. An method of providing a player with an interactive computer game comprising the steps of:

A. communicating user input to the computer system;

B. displaying on a display an array of elements in rows and columns in a rectangular field, each of the elements having a feature selected from a finite set of features that are distinguishable by a player of the game;

C. moving on the display at least one of the elements around the periphery of the rectangular field in response to user input via interactive means; and D. adding to one of the rows and columns of the array an element that was moved there from elsewhere on the display and for removing an element from that row or column, whereby the features on the elements in a row or column can be changed to create predetermined patterns, wherein the step of adding an element and removing an element from a row or column comprises shifting a row or column by one element, such that an element is added at one end of a row or column and removed from an opposite end of said row or column, wherein the removed element becomes movable on the display around the periphery of the field in response to the user input.

23. The method of claim 22 wherein the elements are displayed as colored squares, the set of features is the set of colors of the squares, and the predetermined patterns are rows and columns having the squares colored identically.

* * * * *